United States Patent [19]

Allen

[11] Patent Number: 4,739,528
[45] Date of Patent: Apr. 26, 1988

[54] TIE-DOWN SYSTEM WITH SLEEPING MAT FOR THE BED OF A PICK-UP TRUCK

[76] Inventor: Dennis M. Allen, 7130 N. 175th Ave., Waddell, Ariz. 85355

[21] Appl. No.: 908,788

[22] Filed: Sep. 18, 1986

[51] Int. Cl.⁴ .............................................. B60P 7/02
[52] U.S. Cl. ....................................... 5/119; 296/100; 410/118
[58] Field of Search .................... 5/119, 118; 296/100; 410/117, 118

[56] References Cited

U.S. PATENT DOCUMENTS

| 1,687,742 | 10/1928 | Thatcher | 5/119 |
| 3,524,673 | 8/1970 | Cramer et al. | 5/118 |
| 3,649,072 | 3/1972 | Cross | 296/100 |
| 4,248,558 | 2/1981 | Lechner | 410/104 |
| 4,607,876 | 8/1986 | Reed | 296/100 |

Primary Examiner—Alexander Grosz
Attorney, Agent, or Firm—Herbert E. Haynes, Jr.

[57] ABSTRACT

A tie-down system for securing articles in the bed of a pick-up truck includes a set of C-shaped channels fixedly secured proximate the upper, inner edges of the side walls, the front wall and the tail gate of the pick-up bed. A plurality of eye bolts is demountably and movably received in the channel members, so that a rope or ropes may be fastened to the eye bolts for holding down articles. The tie-down system may also be used in combination with a sleeping surface having plurality of eyelets, simply by extending a plurality of hooked tension springs between the eye bolts and the eyelets.

9 Claims, 1 Drawing Sheet

U.S. Patent  Apr. 26, 1988  4,739,528

TIE-DOWN SYSTEM WITH SLEEPING MAT FOR THE BED OF A PICK-UP TRUCK

BACKGROUND OF THE INVENTION

1. Field of the Invention

This invention relates in general to vehicle accessories and more particularly to a tie-down system which is usable for securing various articles in the bed of a pick-up truck, and including the tie-down system in combination with a sleeping surface which is demountably held in the bed of the pick-up truck by the tie-down system.

2. Description of the Prior Art

As is well known in the art, pick-up trucks are multi-purpose utility vehicles. Some people use pick-up trucks for light hauling purposes, some people use them for camping and other recreational activities, while others use them for combinations of such uses.

Regardless of the use to which an owner puts his or her pick-up truck, an accessory or accessories are often added to the truck's bed to facilitate the intended usage.

In cases where light hauling is the intended use, an owner will often provide hardware to which rope is attached for the purpose of tying the carried articles down so that they will not bounce or be blown out of the pick-up's bed. The most commonly used hardware is a plurality of eye bolts or cleats which are bolted in holes that are drilled in the bed at various locations by the owner. However, most truck owners are reluctant to drill holes in the exterior surface of their truck bed because such holes detract from the appearance of the truck. Furthermore, eye bolts or cleats attached to the top edges of the bed are unsatisfactory because they interfere with the placement of a tonneau cover on the bed. As a result, none of the current tie-down systems are fully acceptable to the average truck owner.

In cases where the pick-up truck is intended for camping and recreational use, it is often desirable to provide some sort of a sleeping surface which can be easily stored, transported and set up in the bed of the truck so that the truck owner and passengers may simply pull off the road and sleep at their own convenience. Some owners keep cots or air mattresses in the back of their trucks, but neither of these provide as much comfort or are as easy to store as is generally desired.

There exists, therefore, a longfelt need in the art for a tie-down system which is usable for securing items in the back of a pick-up truck without detracting from the appearance of the truck or interfering with the placement of a tonneau cover, and which can be used in combination with a comfortable, easily stored sleeping surface.

SUMMARY OF THE INVENTION

In accordance with the present invention, a new and improved tie-down system and sleeping mat are provided for use in the back of a pick-up truck.

The tie-down system consists of a set of C-shaped channels which are fixedly attached near the upper, inner edges of the sidewalls, front wall, and tail gate of the bed of a pick-up truck. The channels open inwardly into the bed for demountably and slidably receiving a plurality of anchor means which are arranged in spaced apart increments in the channels so as to extend inwardly from the channels into the bed. Each of the anchor means carries an eye bolt to which rope may be attached for the purpose of securing articles in the bed of the pick-up. The position and number of anchor means may be adjusted according to the size and type of both the load and the truck.

When the tie-down system is intended for use with a sleeping surface, a tension spring having a hook at each end is attached to each of the eye bolts in such a way that one of the hooks at the end of the spring is received in the eye bolt and the hook at the opposite end of the spring extends into the interior of the pick-up bed, for engagement with one of a plurality of eyelets provided along the periphery of the sleeping surface. Thus the sleeping surface, which is preferably a mat or a sheet formed from a fabric-like material such as canvas, is suspended over the bed of the pick-up in a manner somewhat similar to a hammock.

Accordingly, it is an object of this invention to provide an adjustable tie-down system for securing objects in the bed of a pick-up truck.

Another object of this invention is to provide an accessory for demountably attaching eye bolts to the upper, inner edges of the walls of a pick-up bed.

Still another object of the invention is to provide a sleeping surface which can be demountably held in the back of a pick-up truck by the tie-down system.

The foregoing and other objects of the present invention as well as the invention itself, may be more fully understood from the following description when read in conjunction with the accompanying drawings.

DETAILED DESCRIPTION OF THE INVENTION

Figure 1:
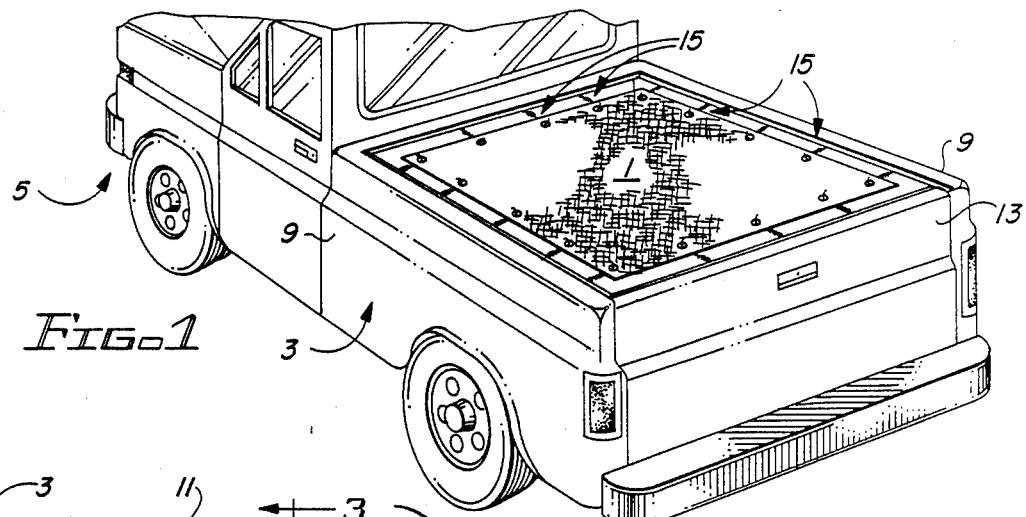
FIG. 1 is a perspective view showing a sleeping surface held in the bed of a pick-up truck by the tie-down system of the present invention.
Figure 2:
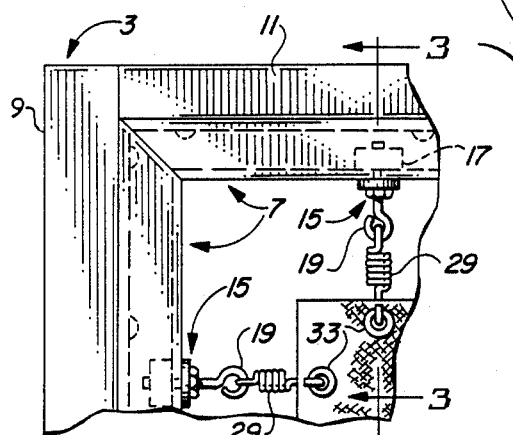
FIG. 2 is an enlarged fragmentary top view showing the tie-down system and sleeping surface of the present invention.

Referring more particularly to the drawings, FIG. 1 shows the tie-down system of the instant invention used to suspend a sleeping mat 1 in the bed 3 of a conventional pick-up truck 5.

Figure 3:
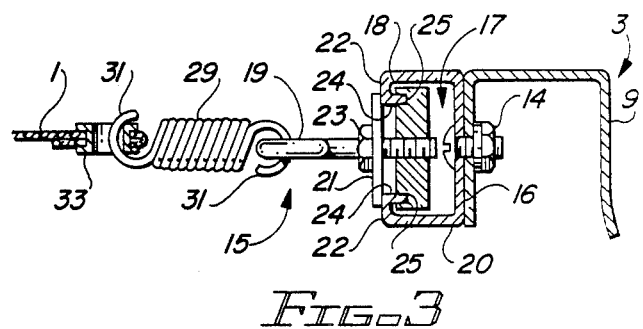
FIG. 3 is a sectional view through line 3—3 of FIG. 2 showing the tie-down system of the present invention.

The tie-down system consists of a set of C-shaped channels 7 fixedly attached near the upper, inner edges of the side walls 9, front wall 11, and tail gate 13 of the bed 3 by means of fasteners 14 such as illustrated and seen best in FIG. 3. The top edges of the channels 7 should be even with or below the top edges of the walls and tail gate of the bed in order to prevent interference with the placement of a tonneau cover on the bed in the manner well known in the art. The channels 7 open inwardly into the bed for slidably and demountably receiving a plurality of anchor means 15 which are arranged in adjustably spaced apart increments in the channels 7 so as to extend inwardly from the channels into the bed 3.

As seen best in FIG. 3, each of the channels 7 is of substantially C-shape in cross section and therefore has an elongated bight portion 16 which is attached in contiguous engagement with the inwardly and downwardly extending top ledge of the walls 9 of the pick-up's bed 3 by the fastener means 14. Each of the channels 7 further includes a spaced apart pair of elongated flanges 18 and 20 which extend normally from the opposite edges of the bight portion 16. The distal ends of each of the flanges 18 and 20 are folded back into the opening defined by the channel to provide each flange with a longitudinally extending bearing surface 22 and a longitudinally extending inturned lip 24 for reasons which will hereinafter be described in detail.

Each of the anchor means 15 includes a nut plate 17 for placement in the opening defined by its respective one of the channels 7, and an eye bolt 19 is threadingly mounted in an internally threaded bore provided in the nut plate 17. A washer 21 is carried on the shank of the eye bolt 19 for spanning the distance between the bearing surfaces 22 provided on the channels 7, and a jam nut 23, which is threadingly carried on the shank of the eye bolt, is used to demountably hold the washer 21 in bearing engagement with the bearing surfaces 22, as shown. A spaced apart pair of guide grooves 25 is provided in the nut plate 17 for receiving the inturned lips 24 of the channel 7. When the jam nut 23 is loosened, the nut plate 17 will be free for adustable relocation along the length of its channel 7, with the guide grooves 25 sliding along the lips 24 of the channel 7. When the jam nut 23 is tightened, the nut plate 17 is held against rotation by means of the inturned lips 24 being disposed in the guide grooves 25 of the nut plate 17.

Figure 4:
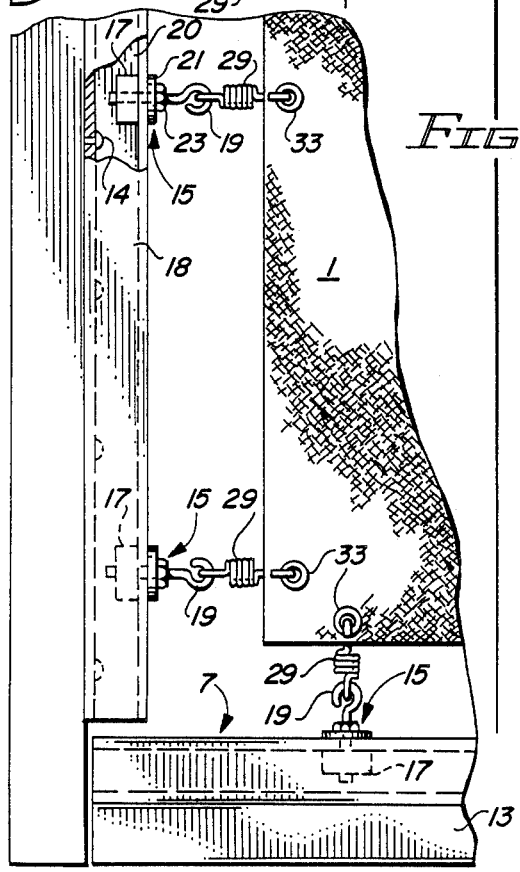
FIG. 4 is a top view showing the tie-down system of the instant invention used with ropes for securing objects in the bed of a pick-up truck.

When the tie-down system is intended to be used for securing objects in the bed 3 of the pick-up 5, it is simply necessary to attach a suitable rope or cord 27, or a plurality of ropes or cords, to each of the anchor means 15, as shown in FIG. 4. It is generally desirable, in this case, to position the anchor means 15 only in the channels 7 located in the sidewalls 9 of the pick-up bed, and to extend the ropes from side to side rather than from front to back, in order to leave the tailgate free for opening and closing, but any configuration and positioning of the anchor means is possible. The number of anchor means may also be adjusted depending on the type of load to be tied down.

In the case when the tie-down system is intended to be used in combination with a sleeping mat 1, a tension spring 29 having a hook 31 at each end is attached to each of the anchor means 15 in such a way that one of the end hooks 31 is carried in the eye bolt 19, and the opposite end hook 31 is received in hooked engagement with one of a plurality of eyelets 33 provided in spaced increments along the periphery of the sleeping mat 1. The sleeping mat 1 may be formed from any suitable fabric-like material, preferably a material such as canvas, which is relatively durable, easily rolled up for storage, and inexpensive. In order to provide a smooth, firm sleeping surface, it is preferred that the anchor means 15 be evenly spaced along all four of the channels 7, so that the sleeping mat 1 is equally supported on all sides and does not tend to sag in any portion. Clearly, the tension of the sleeping mat 1 will be determined by the characteristics of the tension springs 29. Thus, the truck owner should choose the springs based upon his or her sleeping preferences.

While the principles of the invention have now been made clear in the illustrated embodiments, there will be immediately obvious to those skilled in the art, many modifications of structure, arrangement, proportions, the elements, materials and components used in the practice of the invention and otherwise, which are particularly adapted for specific environments and operation requirements without departing from those principles. The appended claims are therefore intended to cover and embrace any such modifications within the limits only of the true spirit and scope of the invention.

I claim as my invention:

1. A sleeping assembly for suspension in the bed of a pick-up truck, said bed having two spaced apart side walls, a front wall, a tail gate and an open interior portion, said sleeping assembly comprising:
    a sleeping mat, said sleeping mat being formed from a sheet of fabric-like material, and having a plurality of fastener-receiving means provided in spaced increments along its periphery;
    a tie-down system for demountably attaching said sleeping mat to the walls of said pick-up bed, said tie-down system including channel means fixedly secured to said side walls, front wall and tail gate of said pick-up bed, and a plurality of anchor means located in spaced apart increments along said channel means; and
    a plurality of releasable fastener means, each mounted between a different one of said anchor means and a different one of said fastener-receiving means of said sleeping mat for suspended mounting of said sleeping mat.

2. The sleeping assembly of claim 1, in which said each of said releasable fastener means comprises a tension spring having a hook at each end.

3. The sleeping assembly of claim 2, in which said anchor means are demountably and movably received in said channel means.

4. The sleeping assembly of claim 3, in which each of said channel means has a C-shaped cross-section and includes:
    an elongated bight portion attached in contiguous engagement with each of said walls;
    a pair of spaced apart elongated flanges extending normally from opposite edges of said bight portions;
    a bearing surface extending normally from each of said flanges and parallel to said bight portion; and
    a longitudinal inturned lip portion extending from each of said bearing surfaces and parallel to said flanges.

5. The sleeping assembly of claim 4, in which each of said anchor means comprises:
    hook-receiving means for receiving one of the ends of one of said tension springs; and
    engagement means for releasably engaging the inwardly-turned lip portions of said channel means.

6. The sleeping assembly of claim 5, in which said hook-receiving means comprises an eye bolt.

7. The sleeping assembly of claim 6, in which said engagement means comprises:
    nut plate means having an internally threaded bore for receiving said eye bolt, and having guide grooves for receiving said inwardly turned lip portions of the channel means; and
    adjustable tightening means for clamping said inwardly turned lip of said channel means against said nut plate means.

8. The sleeping assembly of claim 7, in which said tightening means comprises a jam nut and a washer carried on the shank of said eye bolt.

9. The sleeping assembly of claim 8, in which said fastener-receiving means in said sleeping mat comprises a plurality of evenly spaced eyelets for receiving the hooked ends of said tension springs.

* * * * *